R. B. LIGHT.
Machinists' Square.
No. 31,987.
2 Sheets—Sheet 1.
Patented April 9, 1861.
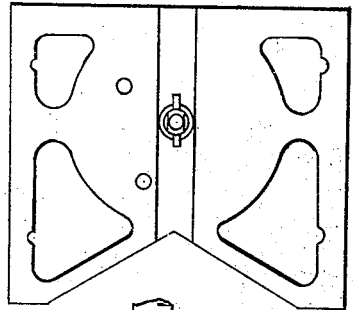
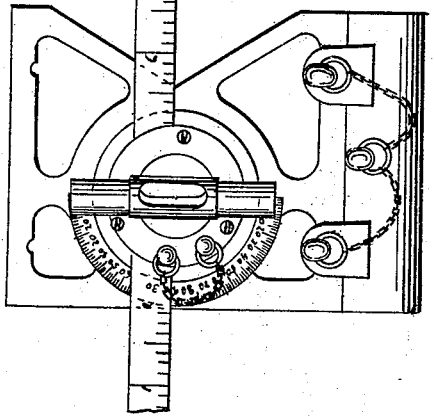
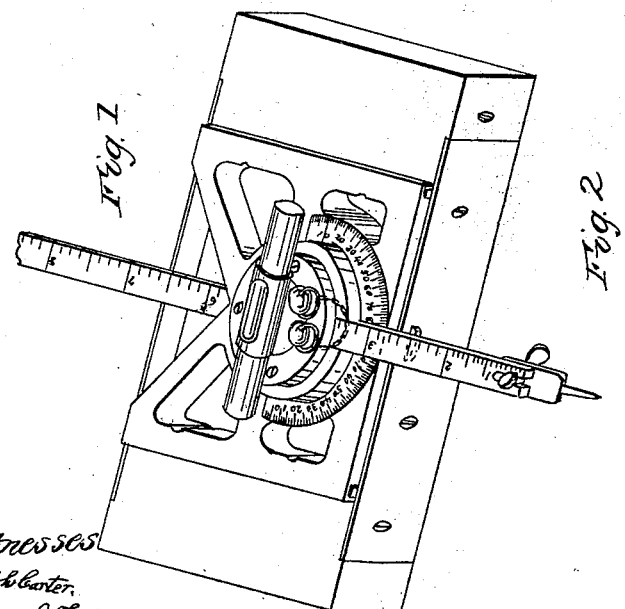
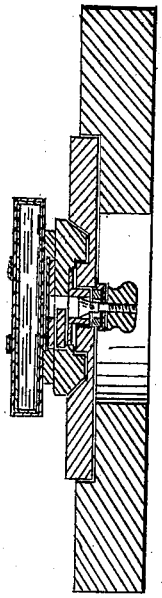
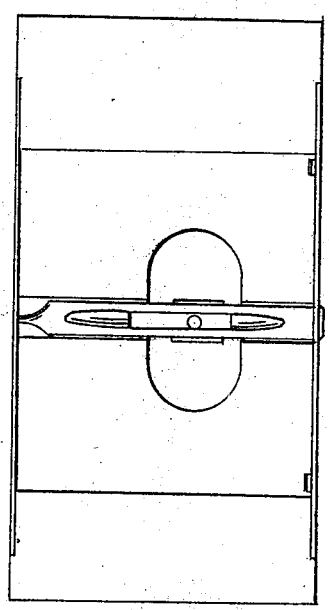

R. B. LIGHT.
Machinists' Square.
No. 31,987.
2 Sheets—Sheet 2.
Patented April 9, 1861.
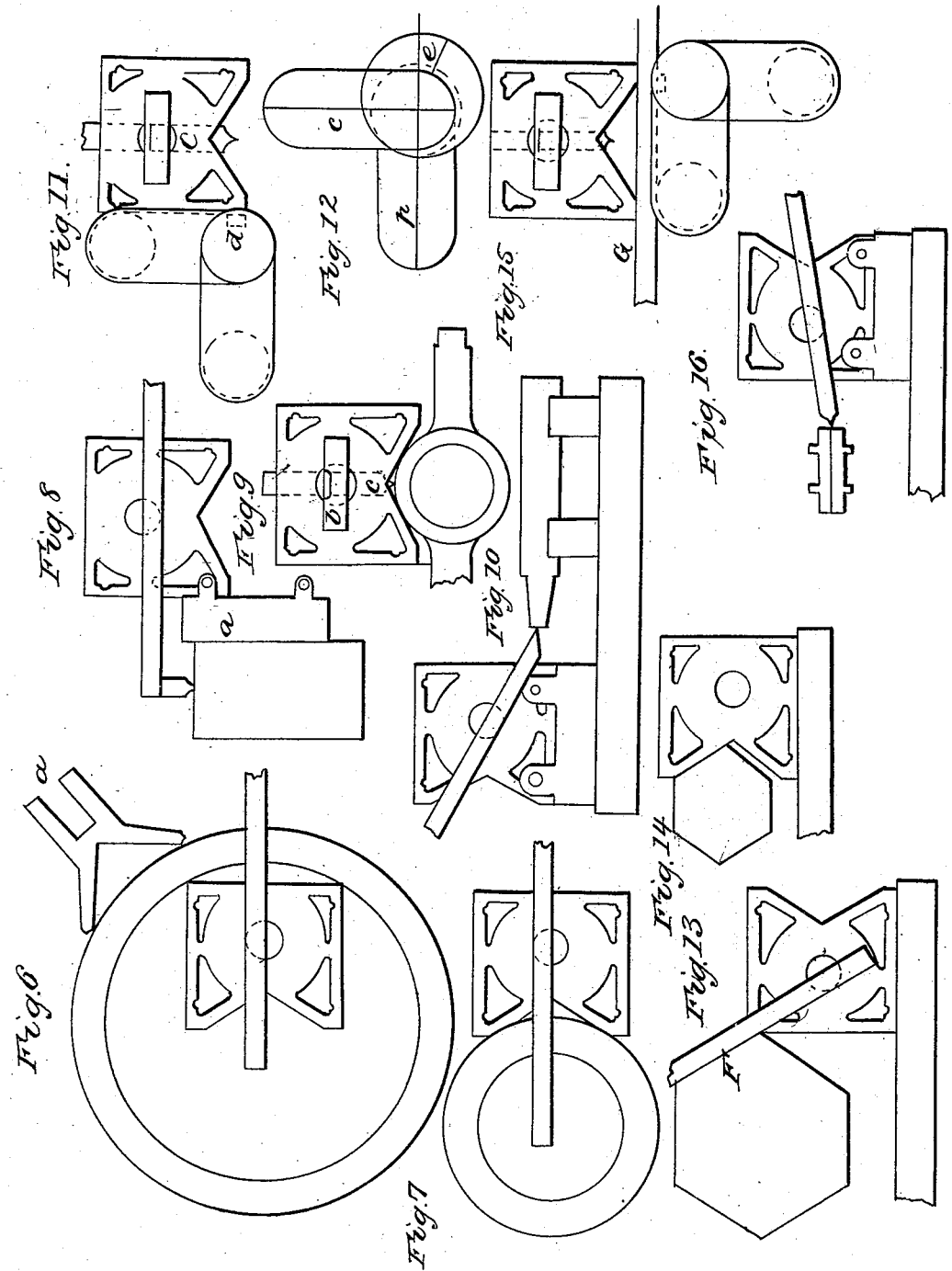

UNITED STATES PATENT OFFICE.

RICHARD B. LIGHT, OF DUNKIRK, NEW YORK.

MACHINIST'S INSTRUMENT FOR DETERMINING GEOMETRICAL LINES, CENTERS, &c.

Specification of Letters Patent No. 31,987, dated April 9, 1861.

*To all whom it may concern:*

Be it known that I, RICHARD B. LIGHT, of Dunkirk, in the county of Chautauqua and State of New York, have invented a certain new and useful Instrument for Mechanical Purposes; and I do hereby declare that the following is a full and exact description thereof, reference being had to the annexed drawings, and to the letters of reference marked thereon, the same making a part of this specification.

In the different figures the same letters of reference denote like parts.

The nature of my invention consists in providing an instrument of small dimensions which can be successfully used in a series of mechanical operations with perfect accuracy, and a great saving of time.

In the said drawings, Figure 1, is a perspective view of the top of the instrument. Fig. 2, is a back view of the same.

Fig. 3, is a longitudinal section.

Fig. 4, is a plan view with the box square attached.

Fig. 5, is a rear elevation of the frame H.

Fig. 6, represents the application of this instrument to the inside of a circle finding the center, when said circle is too large in diameter for outside application; also the application of the box-square (*a*) to project lines on the outside of a shaft, or circular body, and by which application the lines are projected with perfect accuracy.

Fig. 7, represents the application of the instrument to the out side of the circle for the purpose of finding its center.

Fig. 8, represents the instrument attached to the box-square (*a*) and used as a gage by which means lines can be projected on main connecting rods, blocks, or any other work with a flat side to it, either centering or the marking of key-ways or cutter ways.

Fig. 9, represents the application of the instrument to the cross head of a marine engine, where the level (*b*) and the center marker (*c*) are brought into use. The work being leveled, and the instrument placed over it, the level, indicates when the tool is over the center of the work to be lined, or marked. As soon as the level stands perfectly true, a stroke given on the top of the center marker (*c*) gives the exact center of the work; move it farther back, repeat the operation, and it gives the centers at both ends of the work; then apply the box-square, project the lines, and the work is laid out ready for the workman.

Fig. 10, represents the instrument fixed into the box-square for use on a surface plate, and projecting a center line through the center of a crank-shaft, or any other shaft with arms on it. The shaft is laid on blocks upon the surface plate—as shown in the drawing—and the instrument moved along the plate by the hand of the operator until the center line is marked as shown along its entire length.

Fig. 11, shows the manner of using the instrument, or what is sometimes called quartering the crank shaft, for the purpose of placing the eccentrics. The crank is plumbed as shown in the drawing, by placing the instrument against the crank-pin, and a piece of wood (*d*) the radius of which is equal to the radius of the crank-pin. The level in the instrument indicates when the crank is standing in a vertical position. The crank being perpendicular, the instrument is then placed over it as shown in Fig. 9, and when the level indicates the instrument to be horizontal, strike the center marker (*c*,) and it will give the center. The level moving on a center, can then be turned, with its face toward the vertical crank as shown in the drawing, the instrument then turned down and placed with the center marker (*c*) opposite (*d*,) and struck gives the center on that side of the shaft, thus the crank is quartered with perfect accuracy, in a very short space of time. Into these centers, place a compass or divider, and mark still beyond the center the distance of the lead, and the lap of the slide over the steam post, and the exact position of the eccentric is obtained as shown at (E,) Fig. 12.

Fig. 13, shows the use of the instrument on the planing machine. When bevel work is being planed, the straight edge (F,) is placed by the index of the instrument to any bevel required, and acts as the correct gage.

Fig. 14. When the work is too small for the application of the straight edge, as for six sided nuts, the instrument itself is used, the bottom of which is two sides of a hexagon.

Fig. 15, represents the instrument used in connection with a straight edge (G,) when the work is too large for the simple application of the instrument.

Fig. 16, represents the instrument on the planing-machine marking the centers of the cross-head all around for the purpose of planing.

There are but few purposes in the entire region of mechanical operations in which this instrument can not be successfully used.

Having thus fully described my invention what I claim as new and desire to secure by Letters Patent is:

The combination of devices arranged substantially as described, so as to constitute one instrument, whereby the several operations herein referred to, and illustrated, may be executed as set forth.

RICHARD B. LIGHT.

In presence of—
THOMAS FLESHER,
HANSON A. RISLEY.